(No Model.)
R. YERINGTON.
HARROW.
No. 370,670.  Patented Sept. 27, 1887.
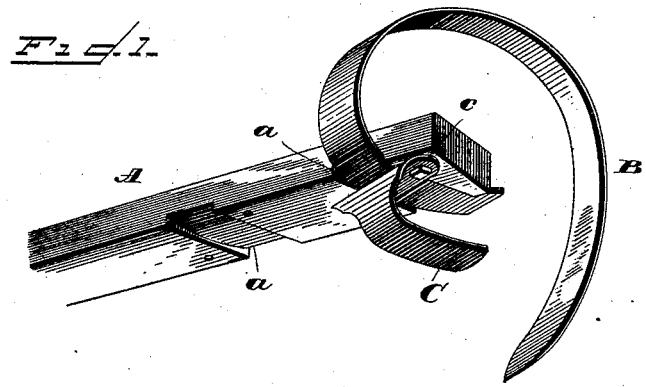
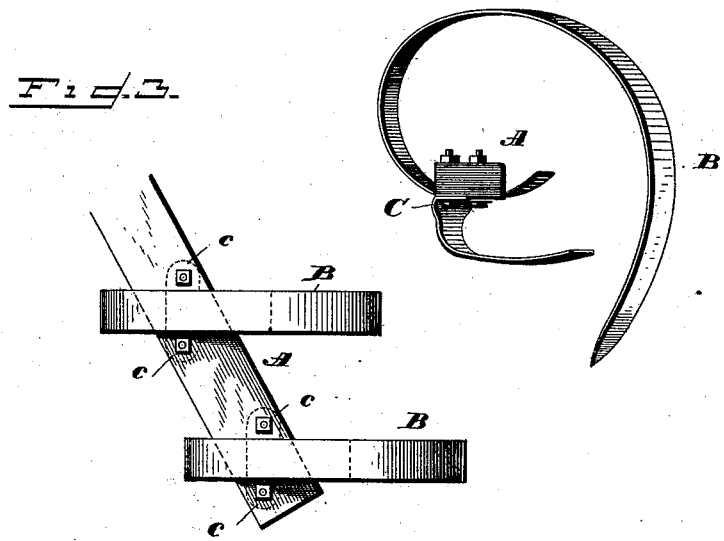
WITNESSES
G. S. Elliott
Reubin Yerington.
INVENTOR
Attorney

UNITED STATES PATENT OFFICE.

REUBIN YERINGTON, OF MIDDLEVILLE, MICHIGAN.

HARROW..

SPECIFICATION forming part of Letters Patent No. 370,670, dated September 27, 1887.

Application filed July 28, 1887. Serial No. 245,528. (No model.)

*To all whom it may concern:*

Be it known that I, REUBIN YERINGTON, a citizen of the United States of America, residing at Middleville, in the county of Barry and State of Michigan, have invented certain new and useful Improvements in Harrows; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in harrows, the object of my invention being to provide a harrow-frame with spring-teeth which have runners, which will prevent the spring-teeth from becoming clogged or entering the ground to a too great a depth, the runners being so constructed as to hold, when attached to the harrow-frame, the teeth securely in position.

My invention consists in the construction and combination of the parts, as will be hereinafter fully set forth, and specifically pointed out in the claims.

In the accompanying drawings, which illustrate my invention, Figure 1 is a perspective view of a spring harrow tooth and runner constructed in accordance with my improvement. Fig. 2 is an end view of one of the beams of the harrow-frame having my improved tooth and runner attached thereto, and Fig. 3 is a plan view.

A refers to one of the beams of a harrow-frame of ordinary construction, said beams diverging from each other. All of the beams constituting the harrow are provided at intervals on their under sides with recesses $a$, the sides of said recesses being parallel with each other, and at an angle with the bottom edges of said beams. These recesses are slightly rounded, so as to conform with the curvature of the spring-teeth B.

C refers to runners, which consist of spring-metal plates which are bent, as shown, the front portions thereof being curved, while the ends are bent so as to be horizontal or parallel with the under sides of the beams. The upper portion of these runners is provided with side projecting portions, $c$ $c$, which have perforations through which pass bolts for securing the same to the beams A of the harrow-frame. The runners C are attached to the beams A at an angle with the edges thereof, so that they will be on a line with the spring-teeth, which occupy a position at an angle with the beams A.

By providing the spring-teeth with spring-runners, as shown, they will be prevented entering the ground too deeply and the beams of the harrow cannot come in contact with the ground. The spring movement of the runners will also prevent the whole beam being thrown out should one of the runners contact with an obstruction on the ground.

I claim—

1. In combination with a spring-tooth for harrows, a runner made of spring metal and attached to the harrow-beam on a line with said tooth and at an angle with the beam to which the spring tooth and runner are secured, substantially as shown, and for the purpose set forth.

2. The combination, with a spring-tooth for harrows, constructed substantially as shown, of a harrow-frame having recesses $a$, which extend diagonally across the beams, and a spring-runner, C, having side projecting portions through which pass bolts, said bolts and runner serving to hold the spring-teeth in place, substantially as shown.

3. In a harrow, the combination of the beams A, having diagonal recesses on their under sides, said recesses being curved, as shown, spring-tooth B, one end of which is adapted to lie within said recess, the opposite end being pointed, runner C, having a rearwardly-extending spring portion, projecting portions $c$ $c$, formed on the upper portion integral therewith, and bolts for securing said runner in position, substantially as shown, and for the purpose set forth.

In testimony whereof I affix my signature in presence of two witnesses.

REUBIN YERINGTON.

Witnesses:
WM. C. OTTO,
JOSEPH BOWERMAN.